: US 12,059,962 B2
(45) Date of Patent: Aug. 13, 2024

(12) United States Patent
Shiraishi

(10) Patent No

(54) CONTROL METHOD FOR MOBILE POWER SUPPLY SYSTEM, AND POWER SUPPLY SYSTEM FOR MOVING BODY

(71) Applicant: GS Yuasa International Ltd., Kyoto (JP)

(72) Inventor: Takeyuki Shiraishi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 616 days.

(21) Appl. No.: 17/274,655

(22) PCT Filed: Sep. 18, 2019

(86) PCT No.: PCT/JP2019/036486
§ 371 (c)(1),
(2) Date: Mar. 9, 2021

(87) PCT Pub. No.: WO2020/059732
PCT Pub. Date: Mar. 26, 2020

(65) Prior Publication Data
US 2022/0048391 A1 Feb. 17, 2022

(30) Foreign Application Priority Data

Sep. 18, 2018 (JP) .................. 2018-173446
Sep. 27, 2018 (JP) .................. 2018-181900

(51) Int. Cl.
*B60L 3/00* (2019.01)
*B60L 3/04* (2006.01)
(Continued)

(52) U.S. Cl.
CPC ............ *B60L 3/0046* (2013.01); *B60L 3/04* (2013.01); *B60L 58/15* (2019.02); *B60L 58/16* (2019.02); *H02H 7/18* (2013.01)

(58) Field of Classification Search
CPC .......... B60L 3/0046; B60L 3/04; B60L 58/15; B60L 58/16; B60L 2210/10;
(Continued)

(56) References Cited

U.S. PATENT DOCUMENTS 6,424,053 B1 7/2002 Wakashiro et al.
9,341,678 B2 * 5/2016 Kim .................. G01R 31/382
(Continued)

FOREIGN PATENT DOCUMENTS

JP 2001-107765 A 4/2001
JP 2015-067042 A 4/2015
(Continued)

OTHER PUBLICATIONS

Haoyi Lu, Chaoyan Liang and Shaojie Weng, "Application of the Semiconductor Breaker/Relay on vehicle circuits," 2009 2nd International Conference on Power Electronics and Intelligent Transportation System (PEITS), Shenzhen, China, 2009, pp. 193-196, doi: 10.1109/PEITS.2009.5407036. (Year: 2009).*
(Continued)

*Primary Examiner* — Stacy Whitmore
(74) *Attorney, Agent, or Firm* — Alston & Bird LLP

(57) ABSTRACT

A method for controlling a power supply system for a moving body, the system including a plurality of energy storage apparatuses that are connected to a moving-body load and connected in parallel with each other, and a current breaker that is provided for each of the energy storage apparatuses and cuts off current of each energy storage apparatus. The method including: a step of detecting an abnormality in each of the energy storage apparatuses; and a step of bringing the current breaker of at least one of the energy storage apparatuses into an energized state when all the energy storage apparatuses are abnormal.

12 Claims, 11 Drawing Sheets

(51) Int. Cl.
*B60L 58/15* (2019.01)
*B60L 58/16* (2019.01)
*H02H 7/18* (2006.01)

(58) Field of Classification Search
CPC ......... B60L 2240/545; B60L 2240/547; B60L 2250/10; B60L 50/64; B60L 58/13; B60L 58/20; B60L 58/21; H02H 7/18; Y02T 10/72; Y02T 10/70; B60R 16/03; H02J 7/00; H02J 7/02; H02J 7/14
See application file for complete search history.

(56) References Cited

U.S. PATENT DOCUMENTS

| | | | |
|---|---|---|---|
| 10,399,518 B2* | 9/2019 | Maekawa | H02J 7/34 |
| 2009/0091332 A1* | 4/2009 | Emori | B60L 50/64 |
| | | | 324/537 |
| 2012/0016547 A1 | 1/2012 | Aridome et al. | |
| 2013/0026989 A1* | 1/2013 | Gibbs | B60L 53/14 |
| | | | 320/116 |
| 2013/0308239 A1 | 11/2013 | Yamada et al. | |
| 2014/0015488 A1* | 1/2014 | Despesse | H01M 10/441 |
| | | | 429/7 |
| 2014/0022681 A1* | 1/2014 | Mitsutani | B60L 1/003 |
| | | | 361/86 |
| 2016/0336736 A1* | 11/2016 | Nomura | H01M 50/583 |
| 2017/0141589 A1* | 5/2017 | Inoue | H02J 7/00 |
| 2017/0214257 A1* | 7/2017 | Shiraishi | B60L 58/15 |
| 2017/0324257 A1 | 11/2017 | Adaniya et al. | |
| 2019/0198945 A1* | 6/2019 | Machida | H02J 7/0016 |
| 2019/0288520 A1* | 9/2019 | Abdel-Monem | H02J 7/0014 |
| 2022/0352561 A1* | 11/2022 | Kim | B60L 3/0092 |
| 2023/0087398 A1* | 3/2023 | Park | H01M 50/30 |
| | | | 429/53 |

FOREIGN PATENT DOCUMENTS

| | | |
|---|---|---|
| JP | 2016-086506 A | 5/2016 |
| WO | WO-2010/100736 A1 | 9/2010 |
| WO | WO-2013/042517 A1 | 3/2013 |
| WO | WO-2016/063760 A1 | 4/2016 |

OTHER PUBLICATIONS

International Searching Authority, International Search and Written Opinion for International Application No. PCT/JP2019/036486, Nov. 19, 2019, (8 pages), Japan Patent Office, Tokyo, Japan.

* cited by examiner

CONTROL METHOD FOR MOBILE POWER SUPPLY SYSTEM, AND POWER SUPPLY SYSTEM FOR MOVING BODY

CROSS REFERENCE TO RELATED APPLICATIONS

This application is a national stage application, filed under 35 U.S.C. § 371, of International Application No. PCT/JP2019/036486, filed Sep. 18, 2019, which international application claims priority to and the benefit of both Japanese Application No. JP2018-173446, filed Sep. 18, 2018 and Japanese Application No. JP2018-181900, filed Sep. 27, 2018; the contents of all of which as are hereby incorporated by reference in their entireties.

BACKGROUND

Technical Field

The present invention relates to a power supply system for a moving body.

Description of Related Art

Recently, developments of automatic braking systems and automatic driving technologies have been actively carried out in automobile manufacturers. Such an electrification trend of vehicles (moving bodies) further increases the importance of the power supply apparatus in a vehicle. Even now, as the power supply in a vehicle, a single lead-acid energy storage apparatus and an alternator are mainly used to supply power. The power supply in a vehicle may be cut off when the energy storage apparatus suddenly fails or a harness connected to an external terminal is cut off, and it has thus been required to connect two energy storage apparatuses in parallel to provide redundancy. Patent Document JP-A-2015-67042 discloses that a power supply apparatus for a vehicle includes a controller, an electric load, a main relay, a starter, an alternator, a lead-acid battery, a nickel-hydrogen rechargeable battery, and the like.

BRIEF SUMMARY

To ensure safety, an energy storage apparatus may be provided with a current breaker that cuts off current when an abnormality such as an overcharge occurs. In a power supply system in which two energy storage apparatuses are connected in parallel, for example, even if one of the two energy storage apparatuses becomes abnormal and the current of the one energy storage apparatus is cut off, the power supply to the vehicle can be continued by the other energy storage apparatus.

However, when the current is cut off at the point of the occurrence of an abnormality in the other energy storage apparatus, both of the two energy storage apparatuses come into a cut-off state, and the power supply to the vehicle is cut off.

Conventionally, sufficient studies have not been conducted on the control in a case where all energy storage apparatuses (the two energy storage apparatuses in the above example) become abnormal.

The present invention has been made based on such circumstances, and an object of the present invention is to prepare for power supply accompanying sudden load fluctuation of a moving body even when all of a plurality of energy storage apparatuses connected in parallel become abnormal.

In a method for controlling a power supply system for a moving body, the system includes a plurality of energy storage apparatuses that are connected to a moving-body load and connected in parallel with each other, and a current breaker that is provided for each of the energy storage apparatuses and cuts off current of each energy storage apparatus. The method includes: a step of detecting an abnormality in each of the energy storage apparatuses; and a step of bringing the current breaker of at least one of the energy storage apparatuses into an energized state when all the energy storage apparatuses are abnormal.

A power supply system for a moving body includes: a plurality of energy storage apparatuses that are connected to a moving-body load and connected in parallel with each other; a current breaker that is provided for each of the energy storage apparatuses and cuts off current of each energy storage apparatus; and a control part, and the control part brings the current breaker of at least one of the energy storage apparatuses into an energized state when all the energy storage apparatuses are abnormal.

Even when all the plurality of energy storage apparatuses connected in parallel become abnormal, it is possible to prepare for the power supply accompanying the sudden load fluctuation of the moving body.

Figure 1:
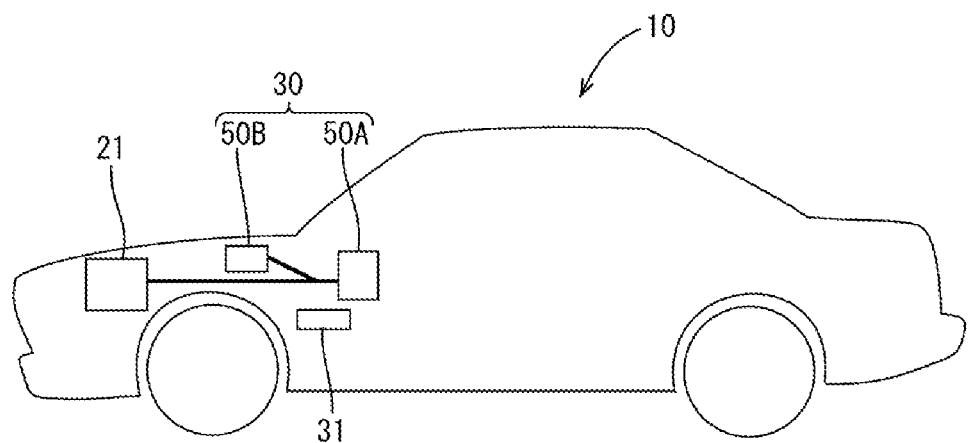
FIG. 1 is a side view of a vehicle in to a first embodiment.

DETAILED DESCRIPTION OF VARIOUS EMBODIMENTS (1) In a method for controlling a power supply system for a moving body, the system includes a plurality of energy storage apparatuses that are connected to a moving-body load and connected in parallel with each other, and a current breaker that is provided for each of the energy storage apparatuses and cuts off current of each energy storage apparatus. The method includes: a step of detecting an abnormality in each of the energy storage apparatuses; and a step of bringing the current breaker of at least one of the energy storage apparatuses into an energized state when all the energy storage apparatuses are abnormal.

When an energy storage apparatus becomes abnormal, it has generally been considered that the safety of the energy storage apparatus is ensured by bringing the current breaker into the cut-off state to interrupt the current.

In the above method, the conventional idea of ensuring the safety of the energy storage apparatus by current interruption is reversed, and when all the energy storage apparatuses are abnormal, at least one current breaker is brought into an energized state. By bringing the at least one current breaker into the energized state, at least one energy storage apparatus is connected to the moving body even after the occurrence of the abnormality, so that it is possible to prepare for the power supply accompanying the sudden load fluctuation of the moving body, as compared to a case where none of the energy storage apparatuses is connected to the moving body.

(2) The method for controlling the power supply system for the moving body may include a step of bringing, when some of the energy storage apparatuses are abnormal, the current breaker of each of the energy storage apparatuses that are abnormal into a cut-off state and maintaining the current breaker of each of the energy storage apparatuses that are not abnormal in the energized state.

In this method, even after some of the energy storage apparatuses are cut off, the other energy storage apparatus can maintain the connection with the moving body. When the abnormality is an overcharge, by maintaining the connection with the moving body, the charge can be continued by another energy storage apparatus which has not become overcharged.

(3) In the method for controlling the power supply system for the moving body, when all the energy storage apparatuses are abnormal, which of the current breakers of the energy storage apparatuses is to be brought into the energized state may be determined based on a type of abnormality of each of the energy storage apparatuses.

In the case of the abnormality of the energy storage apparatus, when the current breaker of the energy storage apparatus is kept in the energized state, the energy storage apparatus may become completely unusable. However, the possibility that the energy storage apparatus becomes completely unusable depends on the type of abnormality. In this method, which of the current breakers of the energy storage apparatuses is to be brought into the energized state is determined based on the type of abnormality, the possibility that the energy storage apparatus becomes completely unusable can be reduced as compared to a case where the determination is made regardless of the type of abnormality.

(4) Each of the energy storage apparatuses includes an energy storage device and a management part that manages the energy storage device, the type of abnormality includes an abnormality in the energy storage device and an abnormality in the management part, and when all the energy storage apparatuses are abnormal, the current breaker of the energy storage apparatus with an abnormality in the energy storage device is brought into a cut-off state, and the current breaker of the energy storage apparatus with an abnormality in the management part may be brought into the energized state.

The abnormality of the management part is less likely to cause the energy storage apparatus to become completely unusable when the current breaker is brought into the energized state than the abnormality of the energy storage device. In this method, since the current breaker of the energy storage apparatus with an abnormality in the management part is brought into the energized state, the possibility that the energy storage apparatus becomes completely unusable can be reduced as compared to a case where the current breaker of the energy storage apparatus with an abnormality in the energy storage device is brought into the energized state.

(5) The abnormality may include an overcharge, and in the method for controlling the power supply system for the moving body, when all the energy storage apparatuses are abnormal, the current breaker of the overcharged energy storage apparatus that is overcharged is brought into a cut-off state, and the current breaker of the energy storage apparatus having an abnormality other than an overcharge may be brought into the energized state.

When the charge is continued, the energy storage apparatus, which is overcharged, takes a shorter time to reach the voltage at which the battery performance is lost than the other energy storage apparatuses having other abnormalities. When the time taken is short, the battery performance may be lost before the moving body stops. For example, when the battery performance is lost, power may not be supplied to the control part of the power supply system, a brake system, a power steering, and the like, and the moving body may not be able to stop safely. A hazard lamp cannot be lighted because the battery performance has been lost. Thus, when all the energy storage apparatuses become abnormal, it is not desirable in terms of safely stopping the moving body to bring the current breaker of the energy storage apparatus, which is overcharged, into the energized state and to bring the current breakers of the other energy storage apparatuses, which have other abnormalities, into the cut-off state.

In the above method, when the charge is continued, the current can be received by an energy storage apparatus which is not overcharged. By receiving the current by the energy storage apparatus which is not overcharged, the time taken for the energy storage apparatus to reach the voltage at which the battery performance is lost is longer than when the charge current is received by the energy storage apparatus which is overcharged, so that the time taken for the moving body to be able to safely stop can be ensured.

(6) The abnormality may include an overcharge, and in the method for controlling the power supply system for the moving body, when all the energy storage apparatuses are abnormal, and when the abnormality of the last abnormal energy storage apparatus is an overcharge, the current breakers of at least two of the energy storage apparatuses, including the last abnormal energy storage apparatus, may be brought into the energized state.

Even when all the energy storage apparatuses become abnormal, it is desirable to ensure a time until the moving body can stop safely, and thus measures have been required.

In the above method, when an abnormality of the last abnormal energy storage apparatus is an overcharge, the current breakers of at least two energy storage apparatuses, including the last abnormal energy storage apparatus, are brought into the energized state, so that the charge current can be shared and received by at least two energy storage apparatuses when the charge continues after the overcharge. When the charge current is shared and received by at least two energy storage apparatuses, the voltage rise of each energy storage apparatus becomes slower than a case where the charge current is received only by one last abnormal (overcharged) energy storage apparatus. This makes longer the time taken for the last abnormal (overcharged) energy storage apparatus to reach the voltage at which the battery performance is lost, so that the time taken for the moving body to safely stop can be ensured.

(7) The abnormality may include an overcharge, and in the method for controlling the power supply system, when all the energy storage apparatuses are overcharged, the current breakers of at least two of the energy storage apparatuses may be brought into the energized state.

Even when all the energy storage apparatuses become overcharged, it is desirable to ensure a time until the moving body can stop safely, and measures have been required.

In this method, at least two current breakers are brought into the energized state, so that when the charge continues after the overcharge, the charge current can be shared and received by at least two energy storage apparatuses. When the charge current is shared and received by at least two energy storage apparatuses, the voltage rise of each energy storage apparatus becomes slower than a case where the charge current is received only by one energy storage apparatus. This makes longer the time taken for each energy storage apparatus to reach the voltage at which the battery performance is lost, so that the time taken for the moving body to safely stop can be ensured.

(8) The method for controlling the power supply system may include a step of switching, when all the energy storage apparatuses are overcharged, the current breaker of each of the energy storage apparatuses except for the last overcharged energy storage apparatus from the cut-off state to the energized state and maintaining the current breaker of the last overcharged energy storage apparatus in the energized state.

In this method, since the energy storage apparatus maintains the connection with the moving body even after all the energy storage apparatuses are overcharged, it is possible to prepare for power supply for the sudden load fluctuation of the moving body. The charge current is shared and received by all the energy storage apparatuses after all the energy storage apparatuses become overcharged, so that the voltage rise of the energy storage apparatuses can be reduced, and the time until the moving body can safely stop can be ensured.

(9) The control method of the power supply system may further include a warning step of requesting the moving body to stop when all the energy storage apparatuses are abnormal.

In this method, it is possible to prevent a driver from continuing to travel without noticing the abnormality after all the energy storage apparatuses become abnormal, and to urge the driver to stop the moving body.

(10) The control method of the power supply system may further include a step of bringing the current breaker of the energy storage apparatus into the cut-off state to prohibit use of all the energy storage apparatuses when an engine stops after the moving body is stopped.

In this method, even after all the energy storage apparatuses become abnormal, the connection between the energy storage apparatuses and the moving body is maintained to ensure a time until the moving body stops safely, and the use of the energy storage apparatuses which has become abnormal can be prohibited after the moving body stops and the engine then stops.

(11) The method for controlling the power supply system may include a step of cutting off current of the energy storage apparatus that exceeds a limit electricity amount by bringing the corresponding current breaker into the cut-off state when an amount of charge of any one of the energy storage apparatuses in which the current breaker is brought into the energized state exceeds a limit electricity amount after all the energy storage apparatuses become abnormal and the current breaker of at least one of the energy storage devices is brought into the energized state.

In this method, after all the energy storage apparatuses become abnormal and the current breaker of at least one energy storage apparatus is brought into the energized state, when the amount of charge of any one of the energy storage apparatuses exceeds the limit electricity amount, the current is cut off, so that the energy storage apparatus can be prevented from being charged exceeding the limit electricity amount. By setting the limit electricity amount within a range in which the battery performance of the energy storage apparatus can be maintained, it is possible to prevent the loss of the battery performance of the energy storage apparatus due to the charge.

First Embodiment

1. Description of Power Supply System 30 of Vehicle

As shown in FIG. 1, a vehicle 10 is an engine-driven vehicle and includes an engine starter 21 such as a starter motor and the power supply system 30. The vehicle 10 is an example of a moving body. Although omitted in FIG. 1, in the vehicle 10, in addition to the engine starter 21, an alternator 23 which is a vehicle generator and an electric load 25 are mounted. The electric load 25 is rated at 12 V and can be exemplified by air conditioning, audio, car navigation, and the like.

Figure 2:
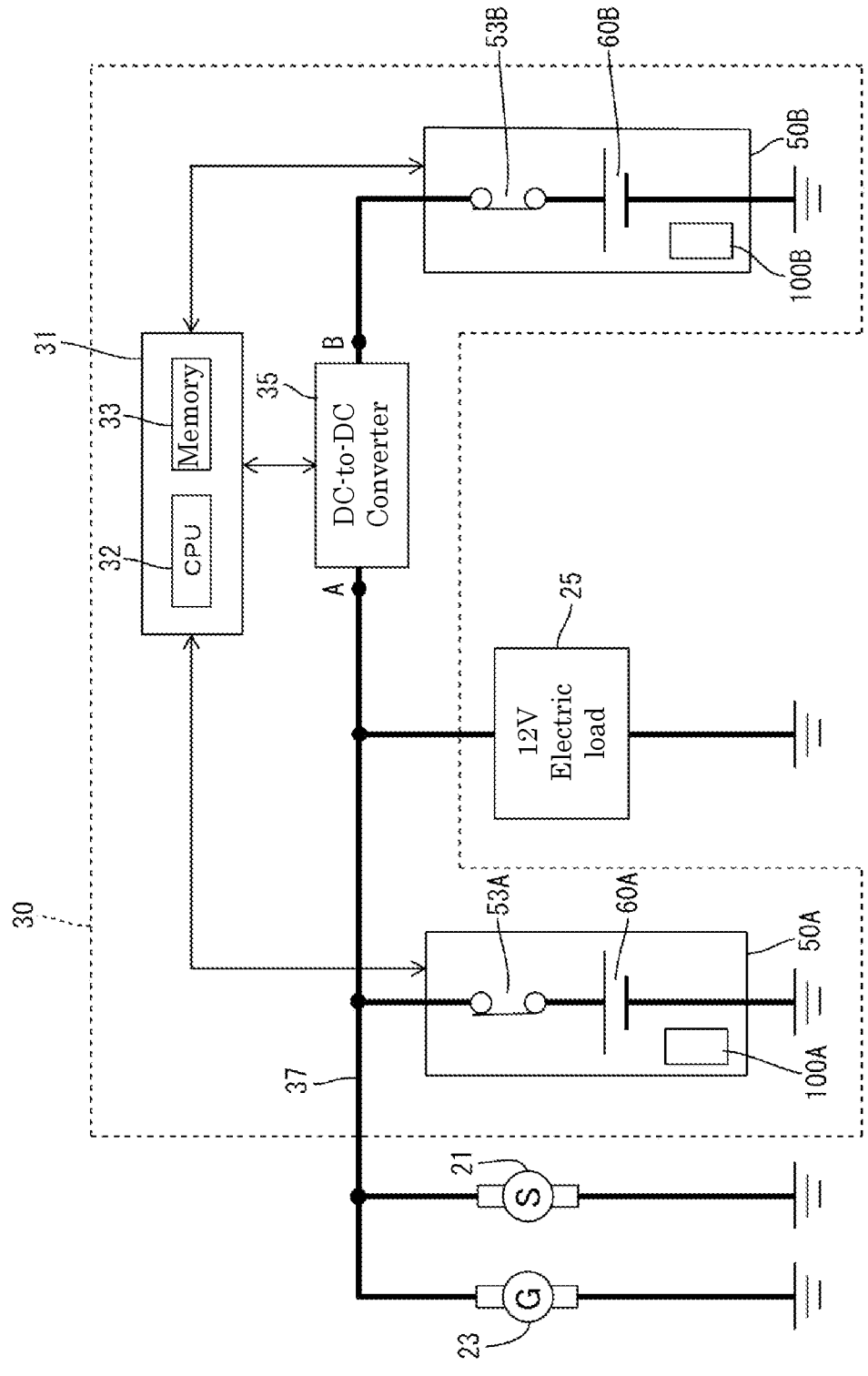
FIG. 2 is a block diagram of a power supply system.

FIG. 2 is a block diagram showing an electrical configuration of the vehicle power supply system 30.

The power supply system 30 includes a first energy storage apparatus 50A, a second energy storage apparatus 50B, a vehicle electronic control unit (ECU) 31, and a DC-to-DC converter 35. The vehicle ECU 31 is an example of a control part. The first energy storage apparatus 50A and the second energy storage apparatus 50B are examples of an energy storage apparatus.

The first energy storage apparatus 50A includes a first current breaker 53A, a first assembled battery 60A, and a first management apparatus 100A, and the second energy storage apparatus 50B includes a second current breaker 53B, a second assembled battery 60B, and a second management apparatus 100B. The first energy storage apparatus 50A and the second energy storage apparatus 50B are rated at 12 V. The first assembled battery 60A is an example of a first energy storage part, and the second assembled battery 60B is an example of a second energy storage part.

The first energy storage apparatus 50A is connected to a power line 37. The engine starter 21, the alternator 23, and the electric load 25 are connected to the first energy storage apparatus 50A via the power line 37. The engine starter 21 and the electric load 25 are examples of a vehicle load.

The second energy storage apparatus 50B is connected to the first energy storage apparatus 50A via the DC-to-DC converter 35. The DC-to-DC converter 35 is a bidirectional DC-to-DC converter capable of controlling the charge and discharge for the second energy storage apparatus 50B. The DC-to-DC converter 35 is an adjuster for controlling the charge and discharge of the second energy storage apparatus 50B. The adjuster may be other than the DC-to-DC converter.

The vehicle ECU 31 is communicatively connected to the first energy storage apparatus 50A, the second energy storage apparatus 50B, and the DC-to-DC converter 35. The vehicle ECU 31 is a control part of the power supply system 30 and includes a central processing unit (CPU) 32 and a memory 33. The vehicle ECU 31 receives monitoring data from the respective energy storage apparatuses 50A, 50B at a fixed cycle. The CPU 32 controls the DC-to-DC converter 35 in accordance with the states of the energy storage apparatuses 50A, 50B, thereby performing charge-discharge control for the energy storage apparatuses 50A, 50B. The memory 33 stores a program for executing charge-discharge control.

The vehicle ECU 31 can obtain information on the operating state of an engine (drive apparatus) and the traveling state of the vehicle 10 from other vehicle ECUs that control the engine of the vehicle 10.

By controlling a voltage at point A near the load, the DC-to-DC converter 35 can control the power supply from the energy storage apparatus 50B to the electric load 25. By making the voltage at point A higher than the output voltage of the alternator 23, power can be supplied to the electric load 25, and by making the voltage at point A lower than the output voltage of the alternator 23, the power supply to the electric load 25 can be stopped (discharge control).

By controlling a voltage at point B near the energy storage apparatus, the DC-to-DC converter 35 can control the power supply to the energy storage apparatus 50B By making the voltage at point B higher than the output voltage of the second energy storage apparatus 50B, power can be supplied from the alternator 23 to the second energy storage apparatus 50B via the power line 37, and by making the voltage at point B lower than the output voltage of the second energy storage apparatus 50B, the power supply to the second energy storage apparatus 50B can be stopped (charge control).

By connecting the two energy storage apparatuses 50A, 50B in parallel, even when an abnormality occurs in one energy storage apparatus (e.g., first energy storage apparatus 50A: main energy storage apparatus), the power supply to the vehicle 10 can be continued by the other energy storage apparatus (e.g., second energy storage apparatus 50B: sub-energy storage apparatus), and the power supply of the vehicle 10 can be provided with redundancy.

Figure 3:
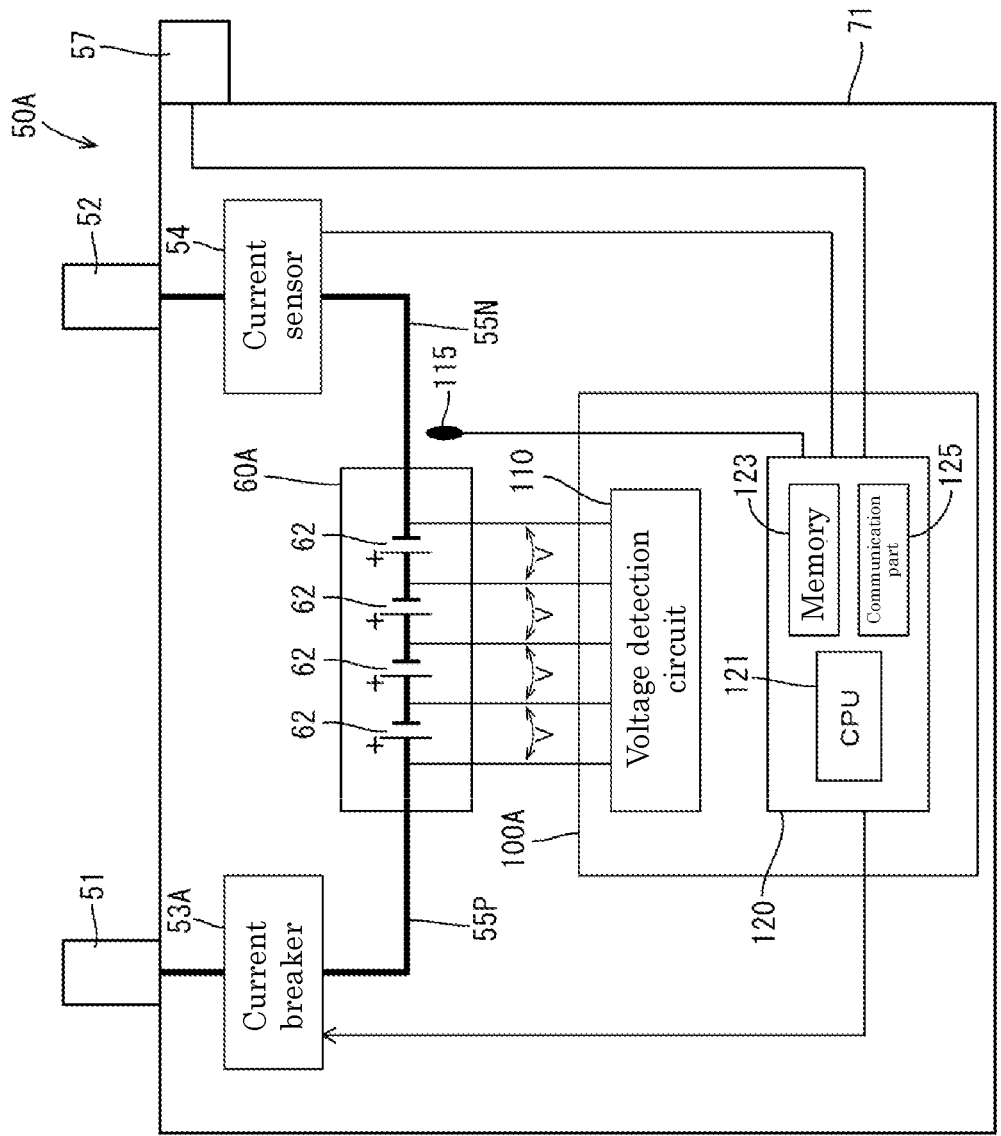
FIG. 3 is a block diagram showing an electrical configuration of an energy storage apparatus.

FIG. 3 is a block diagram showing an electrical configuration of the first energy storage apparatus 50A. The first energy storage apparatus 50A includes the first current breaker 53A, the first assembled battery 60A, a current sensor 54, a first management apparatus 100A, a temperature sensor 115, and a connector 57. The current sensor 54, the first management apparatus 100A, and the temperature sensor 115 are examples of a management part.

The first current breaker 53A, the first assembled battery 60A, and the current sensor 54 are connected in series via power lines 55P, 55N. The power line 55P is a power line for connecting an external terminal 51 of the positive electrode to the positive electrode of the first assembled battery 60A. The power line 55N is a power line for connecting an external terminal 52 of the negative electrode to the negative electrode of the first assembled battery 60A. The first current breaker 53A is located on the positive electrode side of the first assembled battery 60A and provided on the power line 55P on the positive electrode side. The current sensor 54 is located on the negative electrode side of the first assembled battery 60A and provided on the power line 55N of the negative electrode.

The first current breaker 53A can be a contact switch (mechanical type) such as a relay or a semiconductor switch such as a field-effect transistor (FET) or a transistor. By the cut-off of the first current breaker 53A, the first energy storage apparatus 50A is disconnected from the power line 37 of the vehicle 10 to cut off the current. By the energization of the first current breaker 53A, the first energy storage apparatus 50B is connected to the power line 37 and can supply power to the vehicle 10.

The current sensor 54 measures a current I [A] of the first assembled battery 60A. A temperature sensor 115 measures the temperature [° C.] of the first assembled battery 60A in a contact or non-contact manner.

The first management apparatus 100A is provided in the circuit board unit 65. The first management apparatus 100A includes a voltage detection circuit 110 and a processing part 120. The voltage detection circuit 110 is connected to both ends of each secondary battery 62 (an example of an energy storage device) by a signal line and measures the battery voltage V [V] of each secondary battery 62 and the total voltage VB of the first assembled battery 60A. The total voltage VB [V] of the first assembled battery 60A is the total of the voltages of four secondary batteries 62 connected in series.

The processing part 120 includes a CPU 121 having an arithmetic function, a memory 123 which is a storage part, and a communication part 125. The processing part 120 monitors the current I of the first assembled battery 60A, the voltage V of each secondary battery 62, and the total voltage VB and the temperature of the first assembled battery 60A from the outputs of the current sensor 54, the voltage detection circuit 110, and the temperature sensor 115.

The memory 123 is a non-volatile storage medium such as flash memory or an electrically erasable programmable read-only memory (EEPROM). The memory 123 stores a monitoring program for monitoring the state of the first assembled battery 60A and data necessary for executing the monitoring program. The connector 57 is provided to connect the first energy storage apparatus 50A to the vehicle ECU 31.

Figure 4:
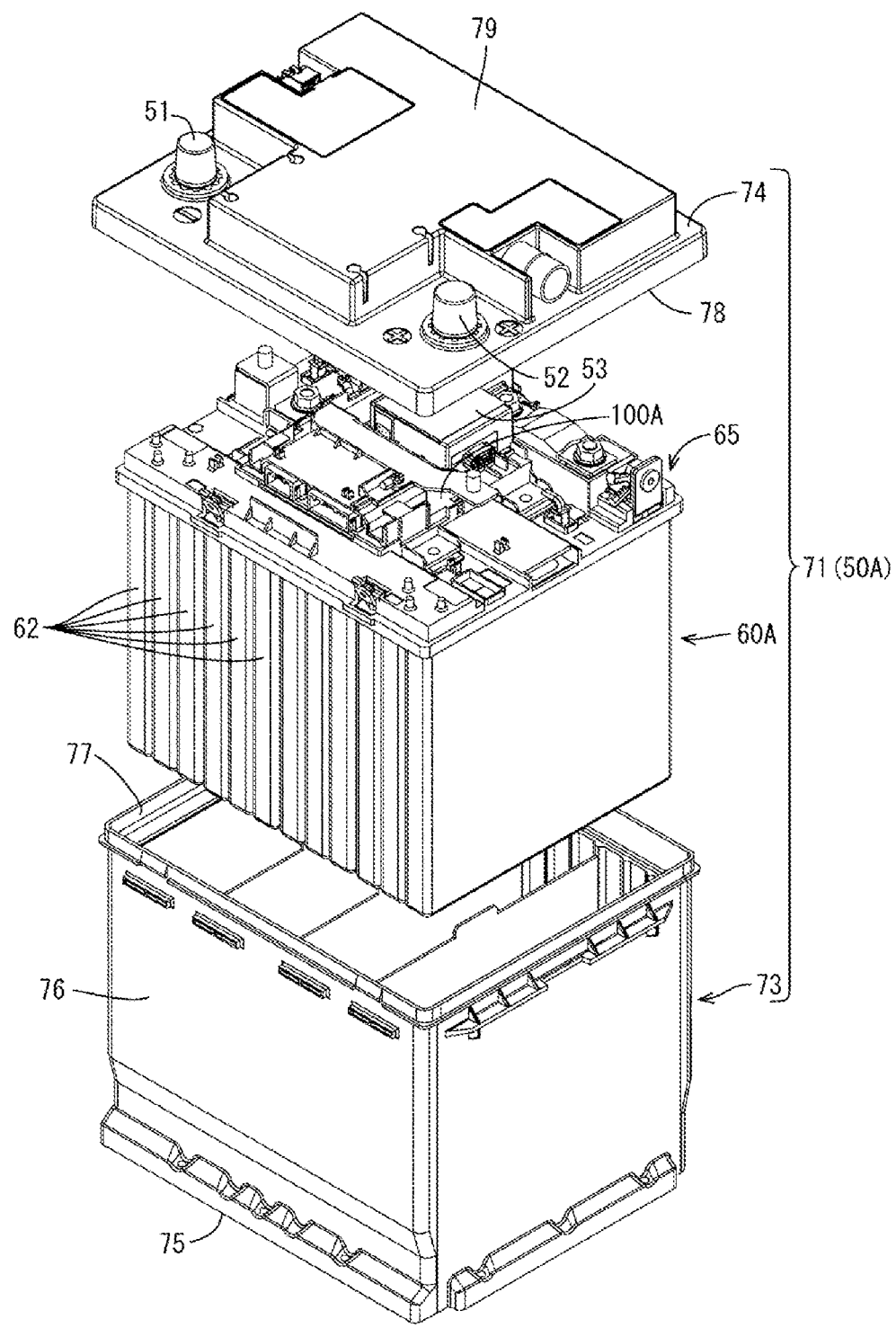
FIG. 4 is an exploded perspective view of the energy storage apparatus.

As shown in FIG. 4, the first energy storage apparatus 50A includes a housing 71. The housing 71 includes a body 73 made of a synthetic resin material and a lid body 74. The body 73 has a bottomed cylindrical shape. The body 73 includes a bottom surface portion 75 and four side surface portions 76. An upper opening 77 is formed in an upper-end portion by the four side surface portions 76.

The housing 71 houses the first assembled battery 60A and a circuit board unit 65. The first assembled battery 60A has twelve secondary batteries 62. The twelve secondary batteries 62 are connected with three in parallel and four in series. The circuit board unit 65 is on the upper portion of the first assembled battery 60A. In the block diagram of FIG. 3, three secondary batteries 62 connected in parallel are represented by one battery symbol.

The lid body 74 closes the upper opening 77 of the body 73. An outer peripheral wall 78 is provided around the lid body 74. The lid body 74 has a protrusion 79 in a substantially T-shape in plan view. The external terminal 51 of the positive electrode is fixed to one corner of the front portion of the lid body 74, and the external terminal 52 of the negative electrode is fixed to the other corner portion.

Figure 5A:
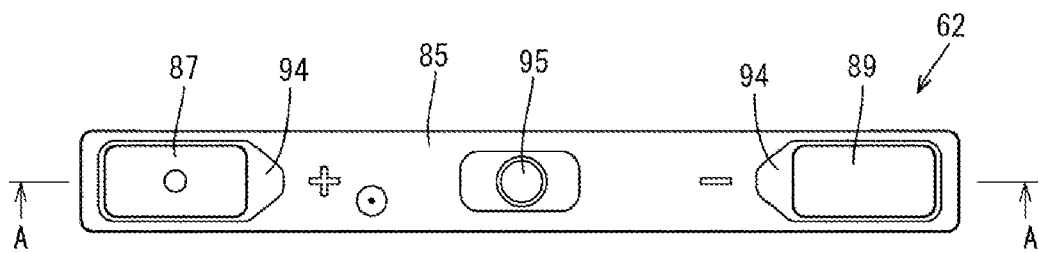
FIG. 5A is a plan view of a secondary battery.
Figure 5B:
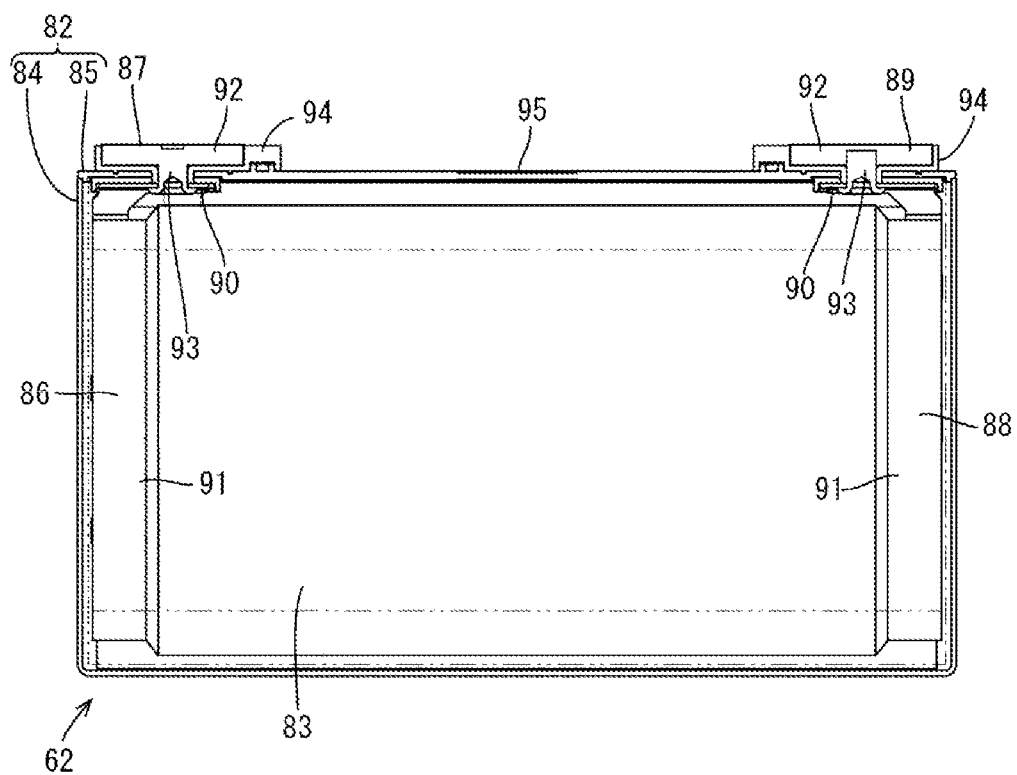
FIG. 5B is a cross-sectional view taken along line A-A of FIG. 5A.

As shown in FIGS. 5A and 5B, the secondary battery 62 houses an electrode assembly 83 in a rectangular parallelepiped case 82 together with a nonaqueous electrolyte. The secondary battery 62 is, for example, a lithium ion secondary battery. The case 82 has a case body 84 and a lid 85 for closing an opening at the top of the case body 84.

Although not shown in detail, the electrode assembly 83 has a separator, made of a porous resin film, disposed between a negative electrode element formed by applying an active material to a substrate made of copper foil and a positive electrode element formed by applying an active material to a substrate made of aluminum foil. These are all belt-shaped, and are wound in a flat shape so as to be able to be housed in the case body 84 in a state where the negative electrode element and the positive electrode element are displaced from each other on the opposite sides in the width direction with respect to the separator.

The positive electrode element is connected to a positive electrode terminal 87 via a positive electrode current collector 86, and the negative electrode element is connected to a negative electrode terminal 89 via a negative electrode current collector 88. Each of the positive electrode current collector 86 and the negative electrode current collector 88 is made up of a plate-shaped base 90 and legs 91 extending from the base 90. A through hole is formed in the base 90. The leg 91 is connected to the positive electrode element or the negative electrode element. Each of the positive electrode terminal 87 and the negative electrode terminal 89 is made up of a terminal body portion 92 and a shaft 93 protruding downward from the center portion of the lower surface of the terminal body portion 92. The terminal body portion 92 and the shaft 93 of the positive electrode terminal 87 are integrally formed of aluminum (single material). In the negative electrode terminal 89, the terminal body portion 92 is made of aluminum, the shaft 93 is made of copper, and these are assembled. The terminal body portions 92 of the positive electrode terminal 87 and the negative electrode terminal 89 are arranged at both ends of the lid 85 via gaskets 94 made of an insulating material and are exposed to the outside from the gaskets 94.

The lid 85 has a pressure release valve 95. As shown in FIG. 5A, the pressure release valve 95 is located between the positive electrode terminal 87 and the negative electrode terminal 89. The pressure release valve 95 is opened when the internal pressure of the case 82 exceeds a limit value to lower the internal pressure of the case 82.

The second energy storage apparatus 50B includes the second assembled battery 60B, the second current breaker 53B, the current sensor 54, the second management apparatus 100B, and the temperature sensor 115 and has the same structure as the first energy storage apparatus 50A. The current sensor 54, the second management apparatus 100B, and the temperature sensor 115 are examples of the management part.

Figure 6:
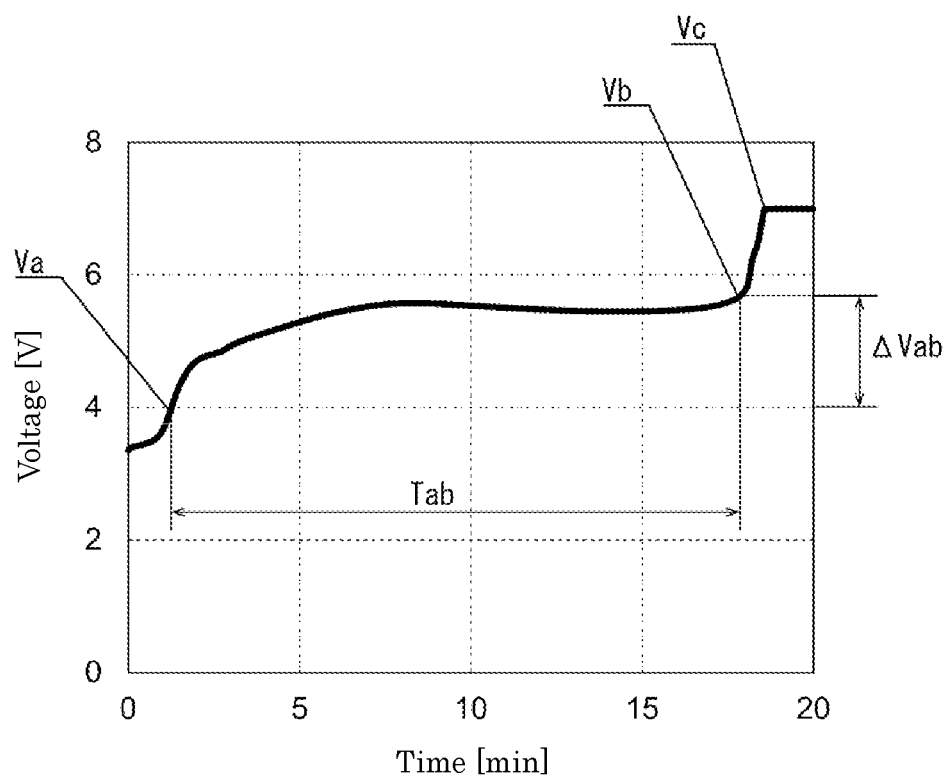
FIG. 6 is a diagram showing a charge curve of the secondary battery.

FIG. 6 is a charge curve when the secondary battery 62 is charged at a predetermined rate, in which the horizontal axis represents time and the vertical axis represents voltage. Va is a threshold voltage (the upper-limit voltage for the safe use of the secondary battery) for the first current breaker 53A and the second current breaker 53B and is 4 V, for example. Vb is a limit voltage at which the secondary battery 62 loses its battery performance and is 5.8 V, for example. Vc is a voltage at which the pressure release valve 95 operates and is 7 V, for example. Losing the battery performance means being able to perform neither charge nor discharge. Equation (1) shows the magnitude relationship among Va, Vb, and Vc.

$$Va < Vb < Vc \quad (1)$$

2. Charge Control

The first management apparatus 100A monitors the state of the first energy storage apparatus 50A, and when an abnormality such as an overcharge or an overdischarge occurs in the first energy storage apparatus 50A, the first management apparatus 100A brings the first current breaker 53A into a cut-off state to interrupt the current. By interrupting the current, the safety of the first energy storage apparatus 50A can be ensured.

The second management apparatus 100B also monitors the state of the second energy storage apparatus 50B, and when the second energy storage apparatus 50B has an abnormality such as an overcharge or an overdischarge, the second management apparatus 100B brings the second current breaker 53B into the cut-off state to interrupt the current.

Since the first energy storage apparatus 50A and the second energy storage apparatus 50B are connected in parallel, even when either the energy storage apparatus 50A or 50B becomes overcharged, and the current is cut off, the other of the energy storage apparatuses 50A, 50B can prepare for the power supply accompanying the sudden load fluctuation of the vehicle 10.

However, when the charge continues due to a failure of an alternator or the like even after one of the energy storage apparatuses 50A, 50B is overcharged and the current is cut off, it is necessary, when the other of the energy storage apparatuses 50A, 50B become overcharged, to bring the current breakers 53A, 53B of the other energy storage apparatuses 50A, 50B into the cut-off state. Thereby, the current is cut off in both the two energy storage apparatuses 50A, 50B, and the two energy storage apparatuses 50A, 50B are disconnected from the vehicle 10. From the viewpoint of the safety of the vehicle 10, even when the two energy storage apparatuses 50A, 50B become overcharged, it is desirable to maintain the connection with the vehicle 10 and to ensure a time until the vehicle 10 can be safely stopped. For example, it is preferable to ensure a time of about 2 minutes.

When both the first energy storage apparatus 50A and the second energy storage apparatus 50B are overcharged, the power supply system 30 controls both the first current breaker 53A and the second current breaker 53B into an energized state. As a result, even after the overcharge, the first energy storage apparatus 50A and the second energy storage apparatus 50B come into a connected state to the vehicle 10 and can thus prepare for the power supply accompanying the sudden load fluctuation of the vehicle 10.

By bringing both the first current breaker 53A and the second current breaker 53B into the energized state, when the charge is continued after the overcharge, the charge current can be shared and received by the two energy storage apparatuses 50A, 50B. By sharing and receiving the charge current by the two energy storage apparatuses 50A, 50B, the voltage rises of the energy storage apparatuses 50A, 50B become slower than a case where only either the energy storage apparatus 50A or 50B receives the charge current. Therefore, for example, when the use of the battery is continued up to a limit voltage Vb, a time Tab until the energy storage apparatuses 50A, 50B reach the limit voltage Vb from the threshold voltage Va becomes longer.

After the two energy storage apparatuses 50A, 50B become overcharged, the time for the energy storage apparatuses 50A, 50B to maintain the connection to the vehicle 10 can be ensured, so that the time until the emergency stop of the vehicle 10 can be ensured.

Figure 7:
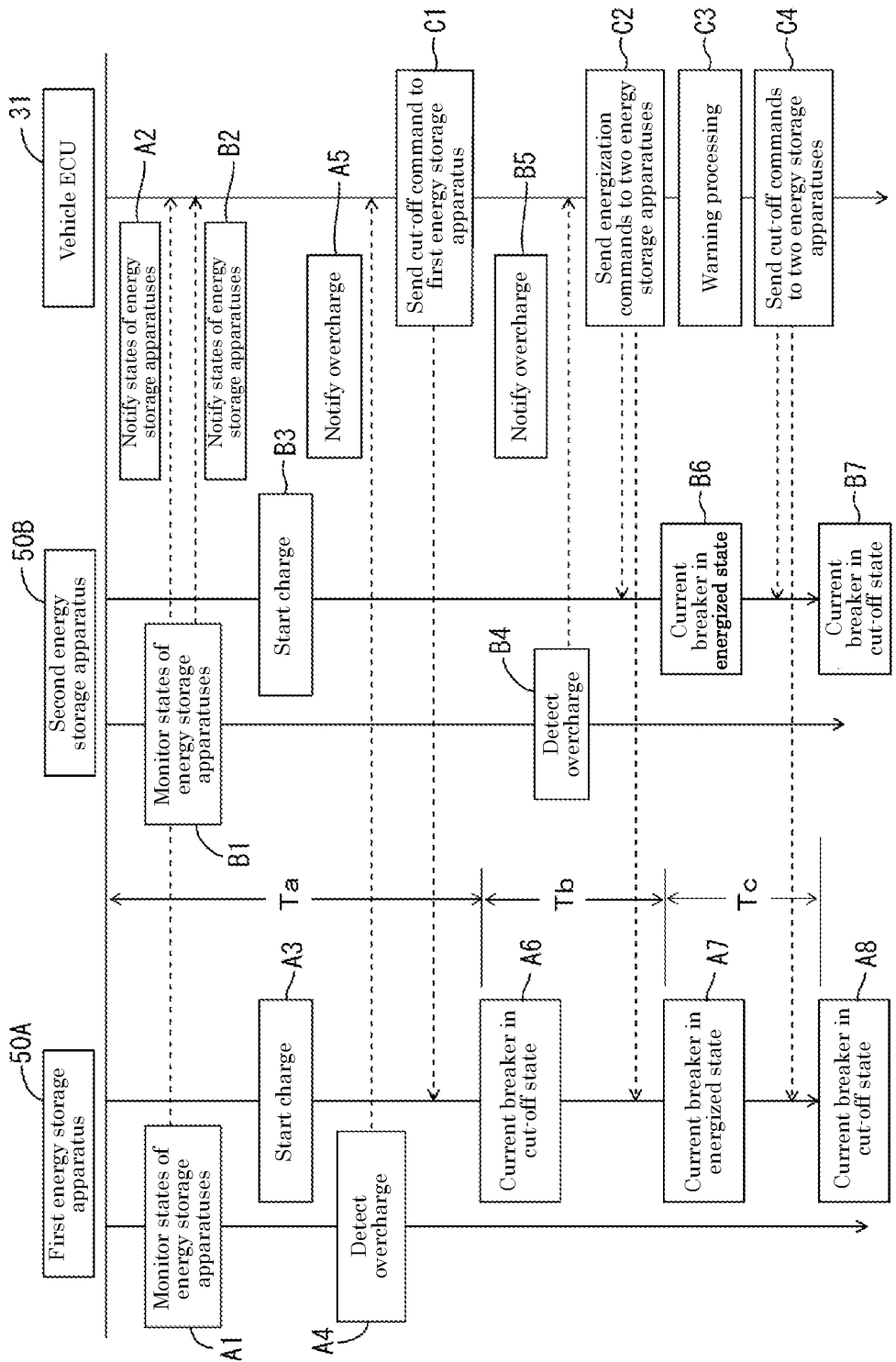
FIG. 7 is a sequence diagram of charge control for the power supply system.

FIG. 7 is a sequence diagram of the charge control for the power supply system 30. In FIG. 7, reference numerals A1 to A8 denote the processing to be executed in the first energy storage apparatus 50A. Reference numerals B1 to B7 denote the processing to be executed by the second energy storage apparatus 50B, and reference numerals C1 to C4 denote the processing to be executed by the vehicle ECU 31.

The first current breaker 53A and the second current breaker 53B are controlled into the energized state by the first management apparatus 100A and the second management apparatus 100B, respectively, except when there is an abnormality such as an overcharge or an overdischarge.

"Ta" indicates a period during which both the first current breaker 53A and the second current breaker 53B are energized. "Tb" indicates a period during which the first current breaker 53A is in the cut-off state and the second current breaker 53B is in the energized state. "Tc" indicates a period during which both the first current breaker 53A and the second current breaker 53B are in the energized state.

The power supply system 30 is activated, for example, when an ignition switch is turned on or a start button is pressed. After the activation of the power supply system 30, the first management apparatus 100A and the second management apparatus 100B start the processing of monitoring the states of the respective energy storage apparatuses 50A, 50B based on the outputs of the voltage detection circuit 110, the current sensor 54, and the temperature sensor 115 (A1, B1). Specifically, the voltage V of each secondary battery 62, the total voltage VB of the assembled batteries 60A, 60B, the current I and the temperature of each of the assembled batteries 60A, 60B are monitored. The first management apparatus 100A and the second management apparatus 100B each compare the voltage V of each secondary battery 62 with the threshold voltage Va to determine the occurrence or non-occurrence of an overcharge. A1 and B1 correspond to the steps of detecting the voltages of the first energy storage apparatus 50A and the second energy storage apparatus 50B.

The first management apparatus 100A and the second management apparatus 100B execute the processing of monitoring the states of the energy storage apparatuses 50A, 50B at a fixed cycle and transmit the results to the vehicle ECU 31 (A2, B2).

When the engine of the vehicle 10 is driven, the alternator 23 starts power generation. When the amount of power generated by the alternator 23 is below the electric load 25, the charge current flows to the two energy storage apparatuses 50A, 50B, and the two energy storage apparatuses 50A, 50B are charged (A3, B3).

When the voltage of any one of the secondary batteries 62 exceeds the threshold voltage Va in the first energy storage apparatus 50A due to the charge, the first management apparatus 100A detects an overcharge (A4). The threshold voltage Va is, for example, 4 V. The overcharge may be determined by the total voltage VB of the assembled battery 60A.

When detecting an overcharge, the first management apparatus 100A notifies the vehicle ECU 31 of the overcharge (A5). When receiving the notice of the overcharge from the first energy storage apparatus 50A, the vehicle ECU 31 notifies the first energy storage apparatus 50A of the interruption command of the first current breaker 53A (C1).

When receiving an interruption command from the vehicle ECU 31, the first management apparatus 100A brings the first current breaker 53A into the cut-off state (A6). By the cut-off of the first current breaker 53A, the current of the first energy storage apparatus 50A is interrupted. Thereafter, the charge current flows only to the second energy storage apparatus 50B that has an empty capacity and has not become overcharged, and the second energy storage apparatus 50B is further charged.

The voltage of the second energy storage apparatus 50B rises due to the charge, and when the voltage of any one of the secondary batteries 62 exceeds the threshold voltage Va, the second management apparatus 100B detects an overcharge (B4). When detecting an overcharge, the second management apparatus 100B notifies the vehicle ECU 31 of the overcharge (B5). A failure of the alternator 23 can be exemplified as a cause for the occurrence of the overcharge in both the first energy storage apparatus 50A and the second energy storage apparatus 50B, When receiving the notice of the overcharge from the second energy storage apparatus 50B in addition to the first energy storage apparatus 50A, the vehicle ECU 31 sends an energization command to the first energy storage apparatus 50A to energize the first current breaker 53A and sends an energization command to the second energy storage apparatus 50B to maintain the second current breaker 53B in the energized state (C2).

When receiving the energization command from the vehicle ECU 31, the first management apparatus 100A switches the first current breaker 53A from the cut-off state to the energized state (A7). When receiving the energization command from the vehicle ECU 31, the second management apparatus 100B maintains the second current breaker 53B in the energized state (B6).

As a result, after the two energy storage apparatuses 50A, 50B become overcharged, both the first energy storage apparatus 50A and the second energy storage apparatus 50B are connected to the power line 37 of the vehicle 10, and can thus prepare for the power supply accompanying the sudden load fluctuation of the vehicle 10. When the charge continues after the overcharge, the charge current is shared and received by the two energy storage apparatuses 50A, 50B.

When receiving the notice of the overcharge from the second energy storage apparatus 50B in addition to the first energy storage apparatus 50A, the vehicle ECU 31 executes warning processing simultaneously with the energization commands to the respective energy storage apparatuses 50A, 50B (C3).

The warning processing is the processing of warning the driver of the emergency stop of the vehicle 10. For example, the vehicle ECU 31 causes an abnormality notification lamp (not shown), mounted on the vehicle 10, to be lighted. By the lighting of the abnormality notification lamp, the abnormality of the vehicle 10 can be notified to the driver to urge the emergency stop. A warning sound may be emitted. When an overcharge occurs, such as a failure of the alternator 23, it is conceivable that the behavior of the vehicle 10 is abnormal. In such a case, it is difficult for the driver to notice the abnormality notification lamp, but urging the emergency stop also by the sound makes it easier for the driver to recognize the abnormality.

When the emergency stop of the vehicle 10 is completed, and the engine (not shown) of the vehicle 10 is stopped thereafter, the vehicle ECU for controlling the engine notifies the vehicle ECU 31 that the vehicle 10 has made an emergency stop and the engine has been stopped. When receiving the notice, the vehicle ECU 31 sends interruption commands to the energy storage apparatuses 50A, 50B to bring the first current breaker 53A and the second current breaker 53B into the cut-off state (C4).

When receiving the interruption commands from the vehicle ECU 31, the first management apparatus 100A and the second management apparatus 100B bring the first current breaker 53A and the second current breaker 53B into the cut-off states to interrupt the current, respectively (A8, B7). In this manner, the use of the first energy storage apparatus 50A and the second energy storage apparatus 50B can be prohibited after the emergency stop of the vehicle.

In the above, the example in which the first energy storage apparatus 50A becomes overcharged earlier has been described. Which of the two energy storage apparatuses 50A, 50B becomes overcharged earlier by charge depends on the usage of the two energy storage apparatuses 50A, 50B. For example, when the state of charge (SOC) of the second energy storage apparatus 50B provided with redundancy is set to be higher than that of the first energy storage apparatus 50A, the second energy storage apparatus 50B tends to become overcharged earlier than the first energy storage apparatus 50A, and when the SOC of the second energy storage apparatus 50B is set to be lower than that of the first energy storage apparatus 50A, the second energy storage apparatus 50B tends to become overcharged later than the first energy storage apparatus 50A. The state of charge (SOC) is the ratio of the residual capacity to the available capacity of the energy storage apparatus.

Also, in a case where the second energy storage apparatus 50B becomes overcharged earlier, by bringing the two current breakers 53A, 53B into the energized state at a point when the first energy storage apparatus 50A then becomes overcharged, the connection with the vehicle 10 can be maintained. The same applies to a case where the two energy storage apparatuses 50A, 50B are overcharged simultaneously.

3. Effect

In this method, when both the first energy storage apparatus 50A and the second energy storage apparatus 50B are overcharged, the first current breaker 53A and the second current breaker 53B are brought into the energized state. As a result, even after the overcharge, the first energy storage apparatus 50A and the second energy storage apparatus 50B maintain in the connected state to the vehicle 10 and can thus prepare for the power supply accompanying the sudden load fluctuation of the vehicle 10.

By bringing both the first current breaker 53A and the second current breaker 53B into the energized state, when the charge is continued after the overcharge, the charge current can be shared and received by the two energy storage apparatuses 50A, 50B. By sharing and receiving the charge current by the two energy storage apparatuses 50A, 50B, the voltage rises of the energy storage apparatuses 50A, 50B become slower than a case where only either the energy storage apparatus 50A or 50B receives the charge current. Thus, a time can be ensured until the secondary battery 62 reaches the limit voltage Vb at which the battery performance is lost, so that it is possible to cause the vehicle 10 to make an emergency stop with a sufficient time.

Second Embodiment

In a first embodiment, the first energy storage apparatus 50A and the second energy storage apparatus 50B have sent information on the states of the energy storage apparatuses 50A, 50B to the vehicle ECU 31. The vehicle ECU 31 has grasped the states of the two energy storage apparatuses 50A, 50B and determined whether to bring the first current breaker 53A and the second current breaker 53B into the cut-off state or the energized state.

In a second embodiment, the vehicle ECU 31 notifies each of the energy storage apparatuses 50A, 50B of information on the other of the energy storage apparatuses 50A, 50B. Each of the energy storage apparatuses 50A, 50B receives information on the state of the other of the energy storage apparatuses 50A, 50B from the vehicle ECU 31 and determines whether to bring the first current breaker 53A and the second current breaker 53B into the cut-off state or the energized state.

Figure 8:
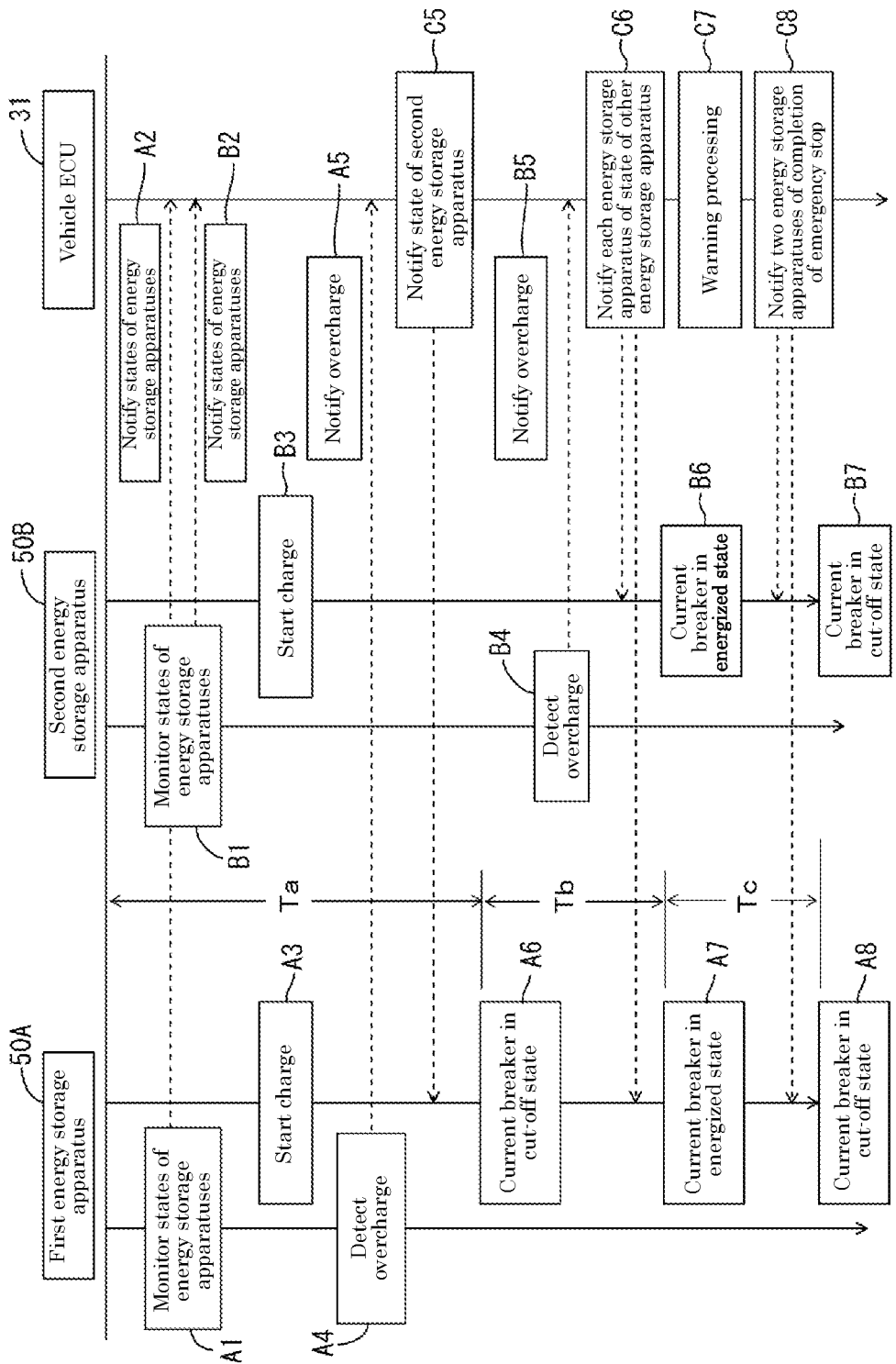
FIG. 8 is a sequence diagram of charge control for a power supply system according to a second embodiment.

FIG. 8 is a sequence diagram of the charge control for the power supply system 30. In FIG. 8, reference numerals A1 to A8 denote the processing to be executed in the first energy storage apparatus 50A. Reference numerals B1 to B7 denote the processing to be executed by the second energy storage apparatus 50B, and reference numerals C5 to C8 denote the processing to be executed by the vehicle ECU 31. The sequence of the charge control shown in FIG. 8 differs from the sequence of the charge control shown in FIG. 7 in steps C5 to C8.

After the activation of the power supply system 30, the first management apparatus 100A and the second management apparatus 100B start the processing of monitoring the states of the respective energy storage apparatuses 50A, 50B (A1, B1).

The first management apparatus 100A and the second management apparatus 100B execute the processing of monitoring the states of the energy storage apparatuses 50A, 50B at a fixed cycle and transmit the results to the vehicle ECU 31 (A2, B2).

When the voltage of the secondary battery 62 exceeds the threshold voltage Va in the first energy storage apparatus 50A due to the charge, the first management apparatus 100A detects an overcharge (A4).

When detecting an overcharge, the first management apparatus 100A notifies the vehicle ECU 31 of the overcharge (A5). When receiving the notice of the overcharge from the first energy storage apparatus 50A, the vehicle ECU 31 notifies the first energy storage apparatus 50A that the second energy storage apparatus 50B is not overcharged.

When the first energy storage apparatus 50A receives from the vehicle ECU 31 that the second energy storage apparatus 50B is not overcharged, the first energy storage apparatus 50A brings the first current breaker 53A into the cut-off state (A6). By the cut-off of the first current breaker 53A, the current of the first energy storage apparatus 50A is interrupted. Thereafter, when the charge is continued, the charge current flows only in the second energy storage apparatus 50B, and the second energy storage apparatus 50B is further charged.

When the voltage of the secondary battery 62 exceeds the threshold voltage Va in the second energy storage apparatus 50B, the second management apparatus 100B detects an overcharge (B4). When detecting an overcharge, the second management apparatus 100B notifies the vehicle ECU 31 of the overcharge (B5).

When receiving the notice of the overcharge from the second energy storage apparatus 50B in addition to the first energy storage apparatus 50A, the vehicle ECU 31 notifies each of the energy storage apparatuses 50A, 50B of the state of the other of the energy storage apparatuses 50A, 50B (C6). In this case, the vehicle ECU 31 notifies the first energy storage apparatus 50A that the second energy storage apparatus 50B is overcharged and notifies the second energy storage apparatus 50A that the first energy storage apparatus 50B is overcharged.

When receiving information from the vehicle ECU 31 that the second energy storage apparatus 50B is overcharged, the first management apparatus 100A switches the first current breaker 53A from the cut-off state to the energized state (A7). When receiving information from the vehicle ECU 31 that the first energy storage apparatus 50A is overcharged, the second management apparatus 100B maintains the second current breaker 53B in the energized state (B6).

As a result, after the two energy storage apparatuses 50A, 50B become overcharged, both the first energy storage apparatus 50A and the second energy storage apparatus 50B are connected to the power line 37 of the vehicle 10, and can thus prepare for the power supply accompanying the sudden load fluctuation of the vehicle 10. When the charge continues, the charge current is shared and received by the two energy storage apparatuses 50A, 50B.

When receiving the notice of the overcharge from the second energy storage apparatus 50B in addition to the first energy storage apparatus 50A, the vehicle ECU 31 executes the warning processing simultaneously with notifying each of the energy storage apparatuses 50A, 50B of the state of the other of the energy storage apparatuses 50A, 50B (C7). The warning processing is the processing of warning the driver of the emergency stop of the vehicle 10.

When the emergency stop of the vehicle 10 is completed, and the engine is stopped thereafter, the vehicle ECU 31 notifies the energy storage apparatuses 50A, 50B of the completion of the emergency stop (C8).

When receiving the notice of the completion of the emergency stop from the vehicle ECU 31, the first management apparatus 100A and the second management apparatus 100B bring the first current breaker 53A and the second current breaker 53B into the cut-off states to interrupt the current, respectively (A8, B7). In this manner, it is possible to prevent the use of the first energy storage apparatus 50A and the second energy storage apparatus 50B after the emergency stop of the vehicle.

As described above, also by the method of receiving the state of the other of the energy storage apparatuses 50A, 50B from the vehicle ECU 31, the states of the two energy storage apparatuses 50A, 50B can be grasped by the respective energy storage apparatuses 50A, 50B.

Thus, in the energy storage apparatuses 50A, 50B, when the two energy storage apparatuses 50A, 50B become overcharged, the respective current breakers 53A, 53B are brought into the energized state, so that the charge control similar to that in the first embodiment can be performed. That is, even after the overcharge, the first energy storage apparatus 50A and the second energy storage apparatus 50B are connected to the vehicle 10, whereby it is possible to prepare for the power supply accompanying the sudden load fluctuation to the vehicle 10. Further, the charge current after the overcharge is shared and received by the first energy storage apparatus 50B and the second energy storage apparatus 50B, so that it is possible to reduce the voltage rises of the energy storage apparatuses 50A, 50B and ensure the time until the secondary battery 62 reaches the limit voltage Vb at which the battery performance is lost.

Third Embodiment

Figure 9:
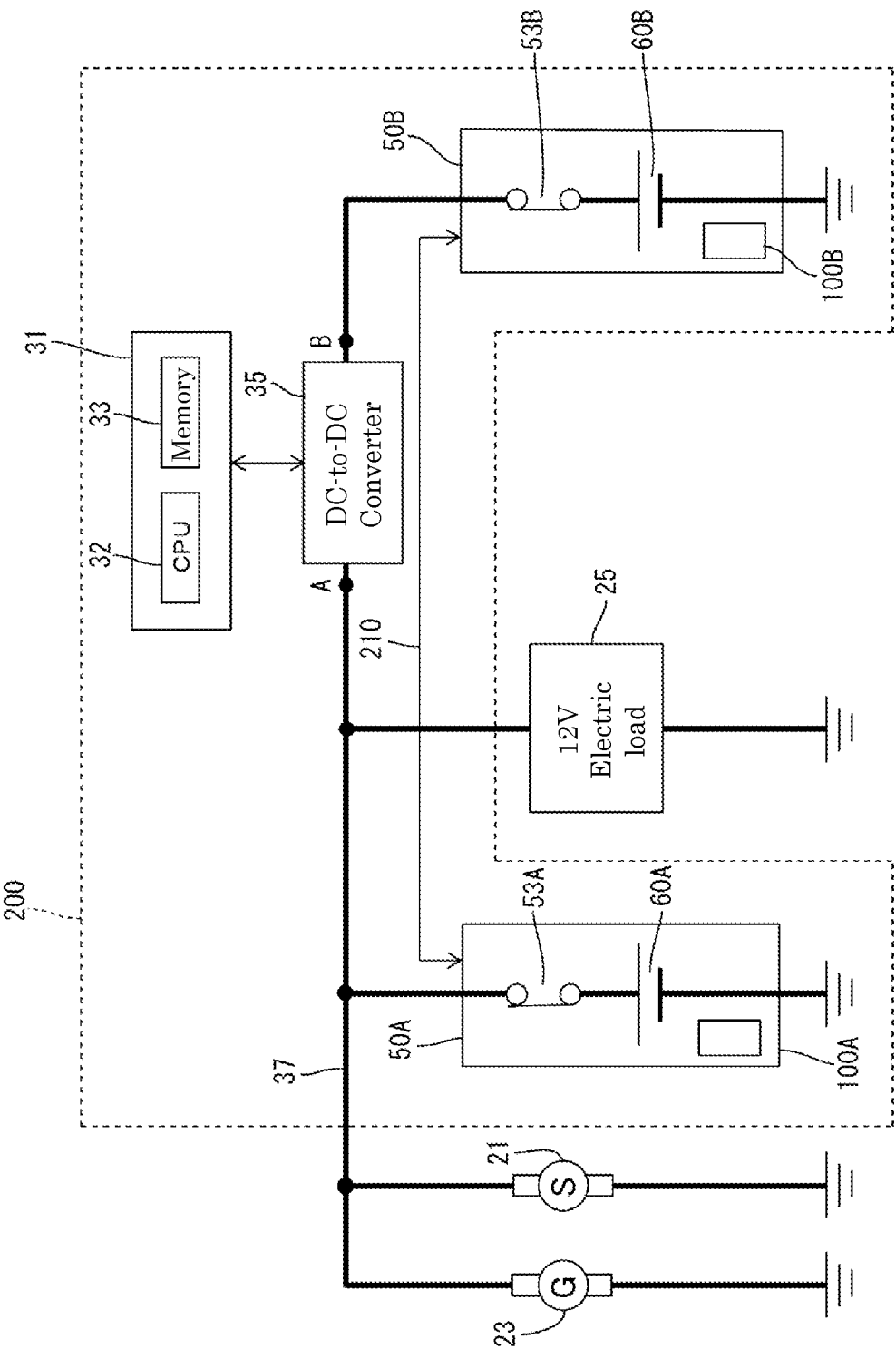
FIG. 9 is a block diagram of a power supply system according to a third embodiment.

As shown in FIG. 9, a power supply system 200 of a third embodiment includes a first energy storage apparatus 50A, a second energy storage apparatus 50B, a vehicle ECU 31, and a DC-to-DC converter 35. The first energy storage apparatus 50A and the second energy storage apparatus 50B are different from those in the first and second embodiments in having no communication function with the vehicle ECU 31.

The first energy storage apparatus 50A and the second energy storage apparatus 50B are connected by a signal line 210, and information on the states of the energy storage apparatuses 50A, 50B, such as the occurrence or non-occurrence of an overcharge is communicated and shared between the energy storage apparatuses. That is, the first energy storage apparatus 50A grasps the occurrence or non-occurrence of the overcharge of the second energy storage apparatus 50B, and the second energy storage apparatus 50B grasps the occurrence or non-occurrence of the overcharge of the first energy storage apparatus 50A.

Thus, in the energy storage apparatuses 50A, 50B, when the two energy storage apparatuses 50A, 50B become overcharged, the respective current breakers 53A, 53B are brought into the energized state, so that the charge control similar to those in the first and second embodiments can be performed.

Fourth Embodiment

In a fourth embodiment, after the overcharge, a limit is set on a charge amount Q [C] for the charge of each of the energy storage apparatuses 50A, 50B. The charge amount Q [C] can be obtained from a charge current I [A] and a charge time t [S].

Figure 10:
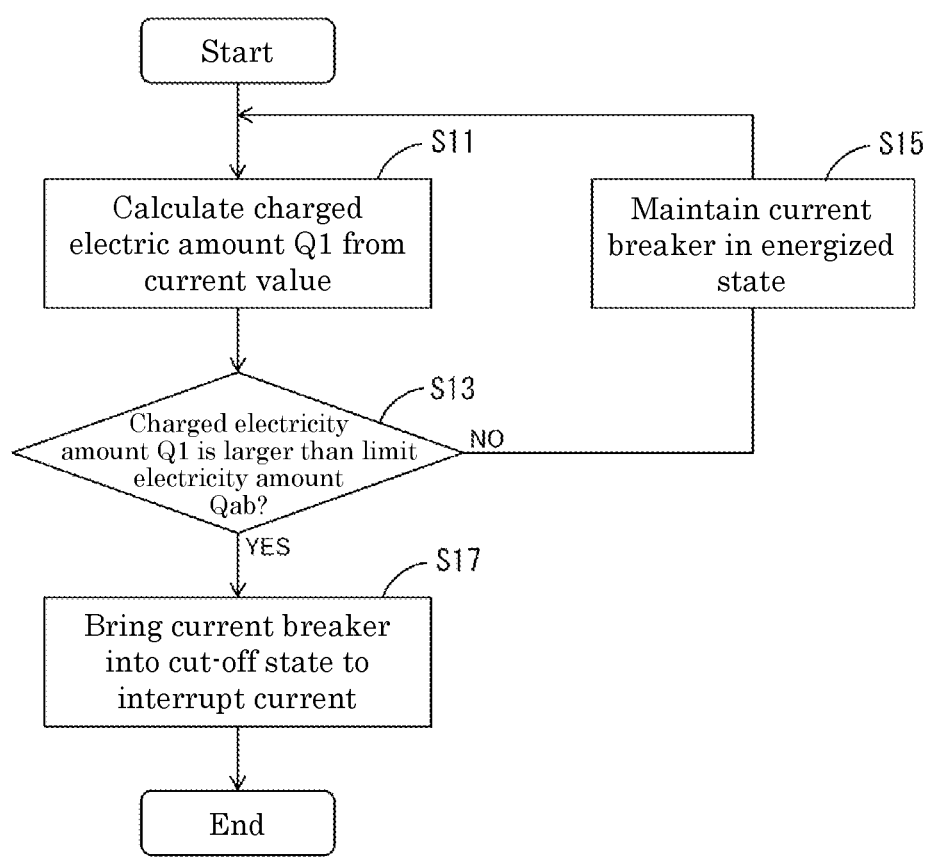
FIG. 10 is a flowchart of the processing of limiting a charge amount Q in a fourth embodiment.

FIG. 10 is a flowchart of the processing of limiting the charge amount Q. The processing of limiting the charge amount Q is individually executed in each of the energy storage apparatuses 50A, 50B after the overcharge. Hereinafter, the energy storage apparatus 50A will be described by way of example.

After the overcharge of the energy storage apparatus 50A, the management apparatus 100A receives a command from the vehicle ECU 31 to switch the first current breaker 53A into the energized state, and during a subsequent period (e.g., period Tc of FIG. 7), the management apparatus 100A calculates a charge amount Q1 for the charge of each one secondary battery, from the charge current I measured by the current sensor 54 and the charge time t (S11).

The management apparatus 100A compares the calculated charge amount Q1 with a limit electricity amount Qab (S13). The limit electricity amount Qab is an electricity amount (cf. FIG. 6) corresponding to a voltage difference ΔVab between the threshold voltage Va and the limit voltage Vb.

When the charge amount Q1 is equal to or less than the limit electricity amount Qab, the management apparatus 100A maintains the first current breaker 53A in the energized state (S13: NO) (S15).

When the charge amount Q1 exceeds the limit electricity amount Qab (S13: YES), the management apparatus 100A brings the first current breaker 53A into the cut-off state to interrupt the current of the energy storage apparatus 50A (S17).

After the overcharge, the charge amount Q1 per secondary battery is limited to be equal to or less than the limit electricity amount Qab, whereby the secondary battery 62 can be charged within a range in which the battery performance can be maintained.

Other Embodiments

The present invention is not restricted to the embodiments described above and the drawings, but, for example, the following embodiments are included in the technical scope of the present invention.

(1) In the above first embodiment, the assembled batteries 60A, 60B have been exemplified as an example of the energy storage part. The energy storage part may be a single cell (one secondary battery 62). The energy storage part is not restricted to the secondary battery 62 but may be an energy storage device such as a capacitor. The power supply system 30 has included the DC-to-DC converter 35, but the DC-to-DC converter 35 may be omitted. For example, when there is no difference in the use of the first energy storage apparatus 50A and the second energy storage apparatus 50B, it is not necessary to adjust the charge and discharge of the second energy storage apparatus 50B independently, and the DC-to-DC converter 35 may be omitted. When there is an adjuster such as the DC-to-DC converter 35, the rated voltages of the two energy storage apparatuses 50A, 50B may be the same or different. In addition, the threshold voltage Va for bringing the first current breaker 53A of the first energy storage apparatus 50A into the cut-off state may be different from the threshold voltage Va for bringing the second current breaker 53B of the second energy storage apparatus 50B into the cut-off state.

(2) In the above first embodiment, the first current breaker 53A and the first management apparatus 100A have been provided inside the first energy storage apparatus 50A, and the second current breaker 53B and the second management apparatus 100B have been provided inside the second energy storage apparatus 50B. The first energy storage apparatus 50A and the second energy storage apparatus 50B need only have at least the assembled batteries 60A, 60B and measuring instruments, and the first current breaker 53A and the first management apparatus 100A may be provided outside the first energy storage apparatus 50A. Similarly, the second current breaker 53B and the second management apparatus 100B may also be provided outside the second energy storage apparatus 50B.

(3) In the above first embodiment, when the emergency stop of the vehicle 10 is completed, and the engine is stopped, the first current breaker 53A and the second current breaker 53B have been brought into the cut-off state, and the use of the energy storage apparatuses 50A, 50B has been prohibited. The timing of prohibiting the use of the energy storage apparatuses 50A, 50B may be after the lapse of a predetermined period from the engine stop. By setting the timing of prohibiting the use of the energy storage apparatuses 50A, 50B to be after the lapse of a predetermined time from the engine stop, it is possible to ensure the time for informing the outside that the vehicle 10 is in an emergency stop state by lighting the hazard lamp or the like.

Figure 11:
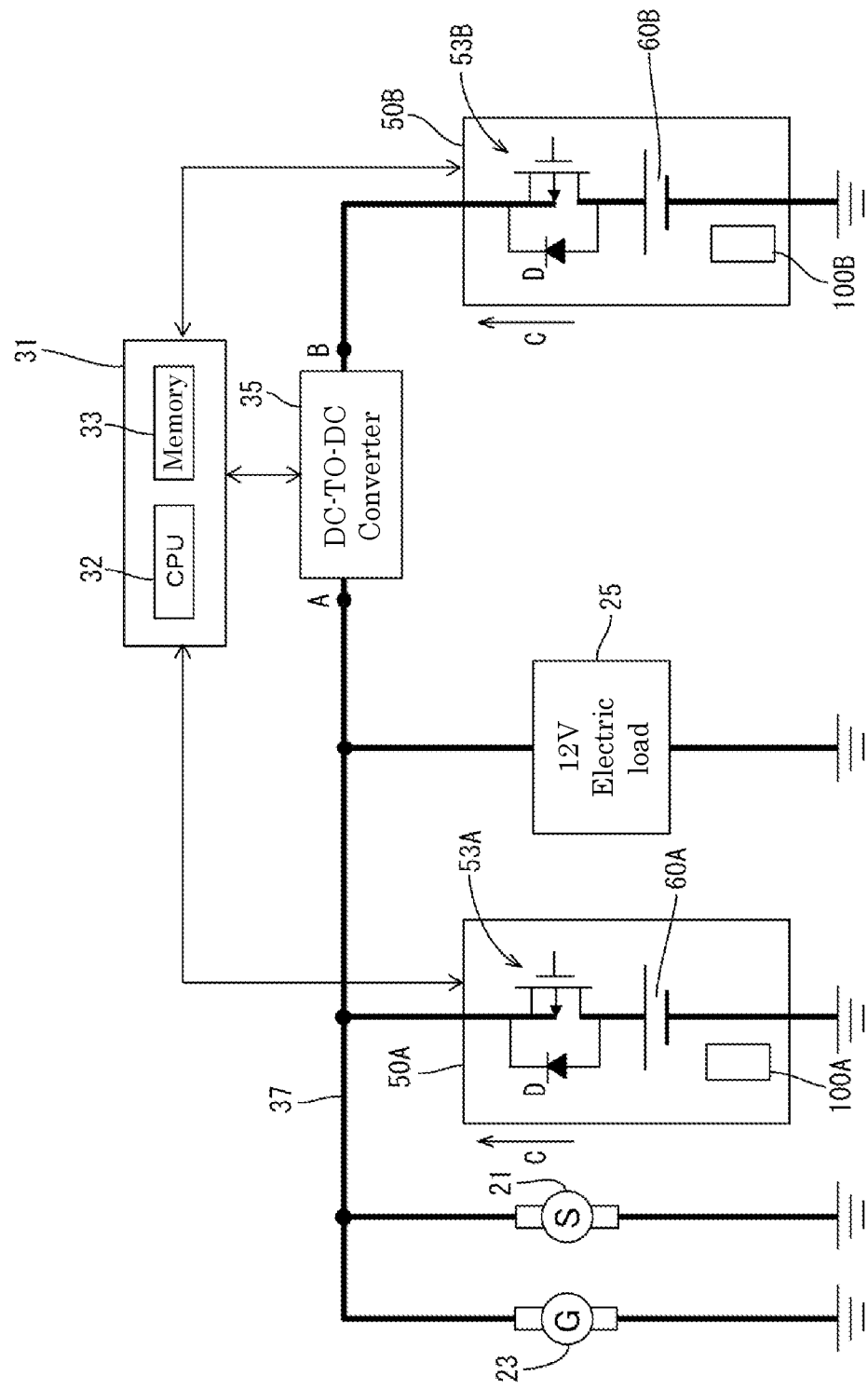
FIG. 11 is a block diagram of a power supply system in another embodiment

(4) The first current breaker 53A and the second current breaker 53B may be, as shown in FIG. 11, a field-effect transistor (FET) incorporating a parasitic diode D with its discharge direction (C-direction) as a forward direction. By using the FET, the discharge can be allowed while the charge is prohibited.

(5) The present technique can be applied to the control program of the power supply system for the vehicle. The control program of the power supply system for the vehicle is a program for causing a computer to execute the processing of bringing the first current breaker 53A, which interrupts the current of the first power accumulating device 50A, and the second current breaker 53B, which interrupts the current of the second power accumulating device 50B, into the energized state when both the first energy storage apparatus 50A and the second energy storage apparatus 50B are overcharged. The present technique can be applied to a recording medium in which the control program of the power supply system for the vehicle is recorded. The computer is, for example, the vehicle ECU 31.

(6) In the above embodiment, an overcharge is exemplified as an abnormality, but the abnormality is not restricted to the overcharge. For example, the abnormality may be the overdischarge of the secondary battery 62, an overcurrent (e.g., an overcurrent due to a failure of the alternator 23 or an overcurrent due to an external short circuit of the energy storage apparatus 50), a temperature abnormality, or the abnormality of the management apparatus 100 (first management apparatus 100A, second management apparatus 100B). Specifically, the abnormality of the management apparatus 100 includes the abnormality of the voltage detection circuit 110, the abnormality of the current sensor 54, the abnormality of the temperature sensor 115, and the abnormality of the communication part 125.

(7) In the above embodiment, the case has been exemplified where, when both of the two energy storage apparatuses 50A, 50B are overcharged, both of the two current breakers 53A, 53B are brought into the energized state. In contrast to this, only either of the two current breakers 53A, 53B may be brought in the energized state. In this way, since at least one energy storage apparatus 50 (energy storage apparatus 50A or 50B) comes into the connected state to the vehicle 10 even after the overcharge, it is possible to prepare for the power supply accompanying the sudden load fluctuation of the vehicle 10, as compared to a case where neither energy storage apparatus 50 is connected to the vehicle 10.

(8) In the case of the abnormality of the energy storage apparatus 50, when the current breaker 53 of the energy storage apparatus 50 is kept in the energized state, the energy storage apparatus 50 may become completely unusable. However, the possibility that the energy storage apparatus 50 becomes completely unusable depends on the type of abnormality. Therefore, as described in (7) above, when the current breaker 53 of either energy storage apparatus 50 (energy storage apparatus 50A or 50B) is brought into the energized state, which current breaker 53 is to be brought into the cut-off state may be determined based on the type of abnormality. In this way, when the current breaker 53 is brought into the energized state the possibility that the energy storage apparatus 50 becomes completely unusable can be reduced as compared to a case where the determination is made regardless of the type of abnormality.

More specifically, the type of abnormality of the energy storage apparatus 50 can be roughly divided into the abnormality of the secondary battery 62 and the abnormality of the management apparatus 100. For example, the overcharge, the overdischarge, and the temperature abnormality of the secondary battery 62 are abnormalities of the secondary battery 62. Although the overcurrent is not an abnormality of the secondary battery 62 itself, the overcurrent can be regarded as the abnormality of the secondary battery 62 because the occurrence of the overcurrent results in the abnormality of the secondary battery 62.

In the case of an abnormality in the secondary battery 62, when the energy storage apparatus 50 continues to be used, the energy storage apparatus 50 may become completely unusable. In contrast to this, in the case of the abnormality of the management apparatus 100, since the secondary battery 62 is normal, the possibility is relatively low that the energy storage apparatus 50 becomes completely unusable even when the energy storage apparatus 50 is used continuously.

Therefore, in a case where one energy storage apparatus 50 has an abnormality in the secondary battery 62 and the other energy storage apparatus 50 has an abnormality in the management apparatus 100, the current breaker 53 of the energy storage apparatus 50 with an abnormality in the secondary battery 62 may be brought into the cut-off state, and the current breaker 53 of the energy storage apparatus 50 with an abnormality in the management apparatus 100 may be brought the energized state. In this way, as compared to a case where the electric current breaker 53 of the electric storage apparatus 50 with an abnormality in the secondary battery 62 is brought into the energized state, the possibility that the energy storage apparatus 50 becomes completely unusable can be reduced.

Alternatively, the type of abnormality of the energy storage apparatus 50 can be roughly divided into an overcharge and the other abnormalities. The other abnormalities are, for example, the overdischarge of the secondary battery 62, a temperature abnormality, and the abnormality of the management apparatus 100.

When the charge is continued after the overcharged, the energy storage apparatus 50, which is overcharged, takes a shorter time to reach the voltage at which the battery performance is lost than the other energy storage apparatuses 50 which have other abnormalities. Therefore, when one energy storage apparatuses 50 is overcharged and the other energy storage apparatus 50 has an abnormality other than an overcharge (an overdischarge, a temperature abnormality, the abnormality of the management apparatus 100, etc.), the current breaker 53 of the energy storage apparatus 50 which is overcharged may be brought into the cut-off state, and the current breaker 53 of the energy storage apparatus 50 having an abnormality other than an overcharge is brought into the energized state. In this way, when the charge is continued, the current can be received by the energy storage apparatus 50 which is not overcharged. By receiving the current by the energy storage apparatus 50 which is not overcharged, the time taken for the energy storage apparatus 50 to reach the voltage at which the battery performance is lost is longer than when the charge current is received by the energy storage apparatus 50 which is overcharged, so that the time taken for the vehicle 10 to be able to safely stop can be ensured.

(9) As described above, the abnormality of the energy storage apparatus 50 includes an abnormality other than an overcharge. When all the energy storage apparatuses 50 are abnormal, and when the abnormality of the last abnormal energy storage apparatus 50 is an overcharge, the current breakers 53 of at least two energy storage apparatuses 50 including the last abnormal (overcharged) energy storage apparatus 50 may be brought into the energized state.

In this manner, when the charge continues after the overcharge, the charge current can be shared and received by at least two energy storage apparatuses 50. When the charge current is shared and received by at least two energy storage apparatuses 50, the voltage rise of each energy storage apparatus 50 becomes slower than a case where the charge current is received by only the last abnormal (overcharged) energy storage apparatus 50. This makes longer the time taken for the last abnormal (overcharged) energy storage apparatus 50 to reach the voltage at which the battery performance is lost, so that the time taken for the vehicle 10 to safely stop can be ensured.

When the abnormality of the last abnormal energy storage apparatus 50 is other than an overcharge, for example, only the current breaker 53 of the last abnormal (overcharged) energy storage apparatus 50 may be brought into the energized state. It is thereby possible to prepare for the power supply accompanying the sudden load fluctuation of the vehicle 10. Alternatively, when the abnormality of the last abnormal energy storage apparatus 50 is other than an overcharge, two or more current breakers 53 including one last abnormal energy storage apparatus 50 may be brought into the energized state.

(10) In the above embodiment, the case has been exemplified where the two energy storage apparatuses 50A, 50B are connected in parallel, but three or more energy storage apparatuses 50 may be connected in parallel.

In the case of three or more energy storage apparatuses 50 as well, when all the energy storage apparatuses 50 become abnormal, the current breakers 53 of all the energy storage apparatuses 50 may be brought into the energized state, or the current breakers 53 of at least one energy storage apparatus 50 may be brought into the energized state. When the current breaker 53 of at least one energy storage apparatus 50 is brought into the energized state, the energy storage apparatus 50 to be brought into the energized state may be determined based on the type of abnormality.

(11) The vehicle 10 (engine-driven vehicle) has been exemplified as a moving body in the above embodiment, but the moving body is not restricted to the engine-driven vehicle. For example, the moving body may be an electric vehicle, a hybrid vehicle, a forklift that travels by an electric motor, an unmanned carrier (automatic guided vehicle (AGV)), or the like.

DESCRIPTION OF REFERENCE SIGNS

10: Vehicle (moving body)
21: engine starter (moving-body load)
23: alternator
25: electric load (moving-body load)
30: power supply system
31: vehicle ECU (control part)
35: DC-to-DC converter
50A, 50B: first energy storage apparatus (energy storage apparatus), second energy storage apparatus (energy storage apparatus)
53A, 53B: first current breaker (current breaker), second current breaker (current breaker)
54: current sensor (management part)
62: secondary battery (energy storage device)
60A, 60B: first assembled battery, second assembled battery
100A, 100B: first management apparatus (management part), second management apparatus (management part)
115: temperature sensor (management part)

The invention claimed is:

1. A method for controlling a power supply system for a moving body, the system including a plurality of energy storage apparatuses that are connected in parallel to a moving-body load, each of the energy storage apparatuses being provided with a current breaker, the method comprising:
   detecting whether an abnormality is present in each of the energy storage apparatuses;
   determining if all the energy storage apparatuses contain a detected abnormality; and
   bringing the current breaker of at least one of the energy storage apparatuses into an energized state only when all the energy storage apparatuses contain the detected are abnormality.

2. The method for controlling the power supply system for the moving body according to claim 1, the method further comprising bringing, when some of the energy storage apparatuses are abnormal, the current breaker of each of the energy storage apparatuses that are abnormal into a cut-off state and maintaining the current breaker of each of the energy storage apparatuses that are not abnormal in the energized state.

3. The method for controlling the power supply system for the moving body according to claim 1, wherein, when all the energy storage apparatuses are abnormal, which of the current breakers of the energy storage apparatuses is to be brought into the energized state is determined based on a type of abnormality of each of the energy storage apparatuses.

4. The method for controlling the power supply system for the moving body according to claim 3, wherein:

each of the energy storage apparatuses includes an energy storage device and a management part that manages the energy storage device, the type of abnormality includes an abnormality in the energy storage device and an abnormality in the management part, and when all the energy storage apparatuses are abnormal, the current breaker of the energy storage apparatus with an abnormality in the energy storage device is brought into a cut-off state, and the current breaker of the energy storage apparatus with an abnormality in the management part is brought into the energized state.

5. The method for controlling the power supply system for the moving body according to claim 3, wherein:

the abnormality includes an overcharge, when all the energy storage apparatuses are abnormal, the current breaker of the overcharged energy storage apparatus that is overcharged is brought into a cut-off state, and the current breaker of the energy storage apparatus having an abnormality other than an overcharge is brought into the energized state.

6. The method for controlling the power supply system for the moving body according to claim 3, wherein:

the abnormality includes an overcharge, and when all the energy storage apparatuses are abnormal, and when an abnormality of the last abnormal energy storage apparatus is an overcharge, the current breakers of at least two of the energy storage apparatuses, including the last abnormal energy storage apparatus, are brought into the energized state.

7. The method for controlling the power supply system for the moving body according to claim 1, wherein:

the abnormality includes an overcharge, and when all the energy storage apparatuses are overcharged, the current breakers of at least two of the energy storage apparatuses are brought into the energized state.

8. The method for controlling the power supply system for the moving body according to claim 7, the method further comprising switching, when all the energy storage apparatuses are overcharged, the current breaker of each of the energy storage apparatuses except for the last overcharged energy storage apparatus from the cut-off state to the energized state and maintaining the current breaker of the last overcharged energy storage apparatus in the energized state.

9. The method for controlling the power supply system for the moving body according to claim 1, the method comprising a warning step of requesting the moving body to stop when all the energy storage apparatuses are abnormal.

10. The method for controlling the power supply system for the moving body according to claim 1, the method further comprising bringing the current breaker of the energy storage apparatus into the cut-off state to prohibit use of all the energy storage apparatuses when an engine stops after the moving body is stopped.

11. The method for controlling the power supply system for the moving body according to claim 1, the method further comprising cutting off current of the energy storage apparatus that exceeds a limit electricity amount by bringing the corresponding current breaker into the cut-off state when an amount of charge of any one of the energy storage apparatuses in which the current breaker is brought into the energized state exceeds a limit electricity amount after all the energy storage apparatuses become abnormal and the current breaker of at least one of the energy storage devices is brought into the energized state.

12. A power supply system for a moving body, the system comprising:

a plurality of energy storage apparatuses that are connected in parallel to a moving-body load;

a current breaker for each of the energy storage apparatuses; and a control part, wherein the control part detects whether an abnormality is present in each of the energy storage apparatuses and brings the current breaker of at least one of the energy storage apparatuses into an energized state only when the detected abnormality is present in all the energy storage apparatuses.

* * * * *

UNITED STATES PATENT AND TRADEMARK OFFICE
CERTIFICATE OF CORRECTION

| | | |
|---|---|---|
| PATENT NO. | : 12,059,962 B2 | Page 1 of 1 |
| APPLICATION NO. | : 17/274655 | |
| DATED | : August 13, 2024 | |
| INVENTOR(S) | : Shiraishi | |

It is certified that error appears in the above-identified patent and that said Letters Patent is hereby corrected as shown below:

In the Claims

Column 20
Claim 1, Lines 49-50, "all the energy storage apparatuses contain the detected are abnormality."
Should read --all the energy storage apparatuses contain the detected abnormality.--

Signed and Sealed this
Twenty-ninth Day of October, 2024

*Katherine Kelly Vidal*

Katherine Kelly Vidal
*Director of the United States Patent and Trademark Office*